(No Model.)
A. N. McCOTTERY.
WHEEL.
No. 442,077. Patented Dec. 2, 1890.
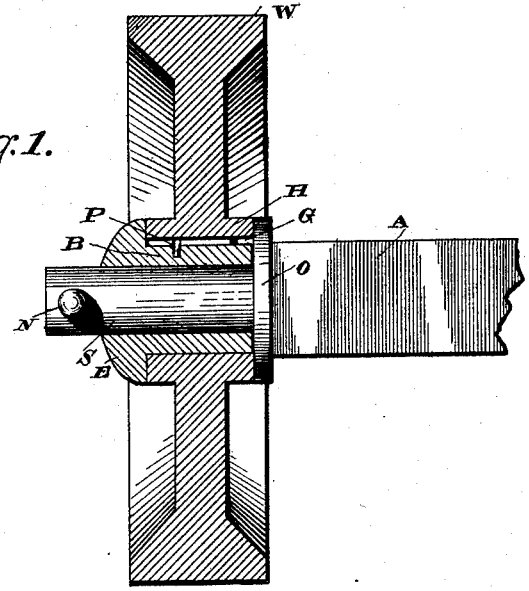
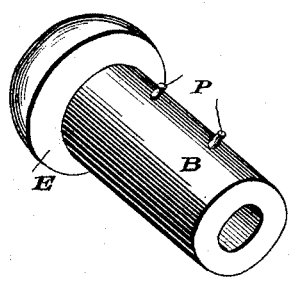
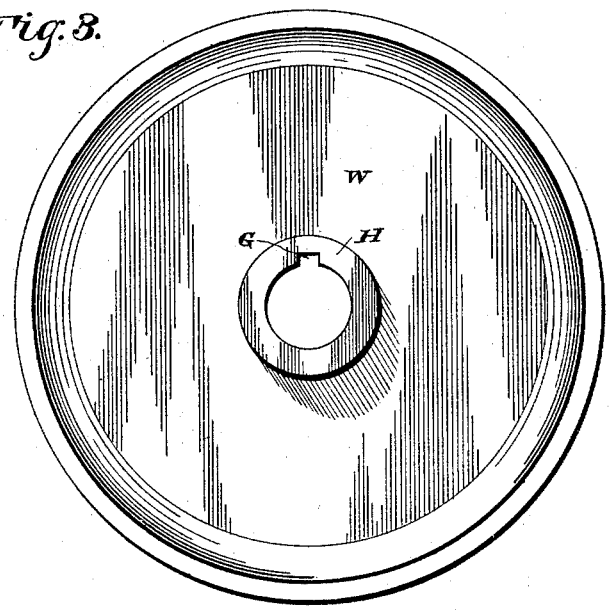
Witnesses
Inventor
Alexander N. McCottery
By his Attorneys,

UNITED STATES PATENT OFFICE.

ALEXANDER N. McCOTTERY, OF FERNANDINA, FLORIDA.

WHEEL.

SPECIFICATION forming part of Letters Patent No. 442,077, dated December 2, 1890.

Application filed August 30, 1890. Serial No. 363,488. (No model.)

*To all whom it may concern:*

Be it known that I, ALEXANDER N. MC-COTTERY, a citizen of the United States, residing at Fernandina, in the county of Nassau and State of Florida, have invented a new and useful Wheel, of which the following is a specification.

This invention relates to trucks, and more especially to the wheels thereof; and the object of the same is to provide an improved removable bushing for said wheels which may be replaced when worn.

To this end the invention consists of the specific details of construction hereinafter more fully described and claimed.

In the drawings, Figure 1 is a central vertical section of a truck-wheel embodying my improvements. Fig. 2 is a detail in perspective of the bushing. Fig. 3 is an elevation of the wheel from the inside, the bushing being removed.

Referring to the said drawings, the letter W designates the body of the wheel, having an elongated hub H, all of which may be of any approved construction and desired material, but is preferably of cast-iron for the sake of cheapness. The hub has a large hole through the center thereof, and at one side, this hole is provided with a groove G, parallel with the axle.

B is a bushing, preferably of case-hardened iron, which bushing fits tightly within the hole through the hub and has two pins P tapped into one side of its exterior, slightly out of alignment, whereby when the bushing is driven into place the pins will bind in the groove G and hold the parts together. One end of the bushing is provided with an enlargement E, which abuts against the end of the hub, and the length of said bushing is slightly less than that of the hub.

A is the axle, which in the present case is stationary—*i. e.*, does not revolve, as is sometimes the case—and this axle has an annular shoulder O, which rests against the inner end of the hub H, as seen in Fig. 1. The spindle S of the axle is of iron, and passes through the bushing, as seen, the outer end thereof having a split pin or nut N resting against said enlargement and holding all the parts together. The parts being properly assem-
bled, it will be obvious that the wear will be upon the spindle and the interior of the bushing, and also upon the inner end of the hub H and outer end of the enlargement E, and when the bushing becomes worn it may be driven out and a new one substituted. In this manner the reproduction of the whole body of the wheel is avoided and considerable expense saved.

What is claimed as the salient features of this invention are—

1. In a wheel, the combination, with the wheel proper W, the hub H thereof, provided with a transverse groove G, and the case-hardened iron bushing B, removably inserted through said hub, and having pins P slightly out of alignment and adapted to engage said groove frictionally, of the axle A, the spindle S thereon, and means for retaining said bushing on the spindle, substantially as specified.

2. In a wheel, the combination, with the wheel proper W, the elongated hub H through the same, the case-hardened iron bushing B, removably inserted through said hub and having an enlargement E at the outer end thereof, the body of said bushing being shorter than the hub, and means for preventing the turning of the hub upon the bushing, of the axle A, the spindle S thereon fitting loosely within said bushing, a shoulder O between said axle and spindle bearing against the inner end of the hub, and fastening devices on the outer end of the spindle bearing against said enlargement, each and all substantially as specified.

3. In a wheel, the combination, with the wheel proper W, the hub H through the same, the case-hardened iron bushing B, removably inserted through said hub and having an enlargement E at the outer end thereof, and means for preventing the turning of the hub upon the bushing, of the axle A, the spindle S thereon fitting loosely in said bushing, the shoulder O between said axle and spindle, and the split pin N through the outer end of the spindle outside said enlargement, substantially as specified.

4. In a wheel, the combination, with cast wheel proper W, the cast elongated hub H through and integral with the same and provided with an internal transverse groove G, the case-hardened iron bushing B, shorter than said hub, within which it fits tightly, pins P, tapped into said bushing slightly out of alignment and adapted to engage said groove frictionally, and an enlargement E at the outer end of said bushing, of the axle A, the spindle S thereon fitting loosely through said bushing, the shoulder O between said axle and bushing resting against the inner end of said hub, and the split pin N through said spindle resting against the outer face of said enlargement, all substantially as hereinbefore set forth.

In testimony that I claim the foregoing as my own I have hereto affixed my signature in presence of two witnesses.

ALEXANDER N. McCOTTERY.

Witnesses:
FRANK WILLIAMS,
JAMES T. O'NEILL.